United States Patent [19]
Joly

[11] 3,970,356
[45] July 20, 1976

[54] SOCKET FOR BUSBARS

[75] Inventor: Jean Joly, Houilles, France

[73] Assignee: La Telemecanique Electrique, France

[22] Filed: Mar. 17, 1975

[21] Appl. No.: 559,359

[30] Foreign Application Priority Data
Apr. 22, 1974 France .............................. 74.13917

[52] U.S. Cl. .......................... 339/252 P; 339/278 C
[51] Int. Cl.² ........................................ H01R 13/06
[58] Field of Search ............ 339/22, 176, 252, 256, 339/258, 262, 275, 278

[56] References Cited
UNITED STATES PATENTS

| | | | |
|---|---|---|---|
| 2,551,423 | 5/1951 | De Vito | 339/252 R |
| 2,743,428 | 4/1956 | Martines | 339/256 R |
| 3,144,290 | 8/1964 | Blonder | 339/176 R |
| 3,675,187 | 7/1972 | Christman | 339/256 R |

FOREIGN PATENTS OR APPLICATIONS 98,753   8/1961   Norway............................ 339/278 C Primary Examiner—Joseph H. McGlynn
Attorney, Agent, or Firm—William A. Drucker

[57] ABSTRACT

The present invention relates to a socket for a busbar. A socket body is formed by folding a copper-aluminium portion in such a way as to form a sheath whose inside is formed by the copper-plated surface which serves for the fixing of the socket to an aluminium busbar by spot welding.

The invention can advantageously be applied to power distribution busbars protected by sheaths.

10 Claims, 4 Drawing Figures

SOCKET FOR BUSBARS

The invention relates to a socket for an aluminium busbar, wherein the socket surface coming into contact with the connecting plug is made of copper.

Sockets of this type are frequently used in power transmission installations where the busbars are assembled within a protective sheath.

The problem of connecting to aluminium busbars has already been solved either by the deposition of copper and/or tin in the connecting area and clamping by means of a connecting member or alternatively by screwing sockets onto the busbar, whereby conductive grease is interposed, followed by the introduction of the plug into the socket.

This latter solution suffers from the disadvantages inherent in the fixing method and more particularly those resulting from behaviour over long periods, size, as well as the high costs involved due to the materials which must be used.

The object of the present invention is to provide a socket, for an aluminium busbar, which is easy to fix, which has a low contact resistance, a small size, a high mechanical strength, and a reasonable cost.

Some embodiments of the invention are set out in the following description with reference to the drawings, wherein.

Figure 1:
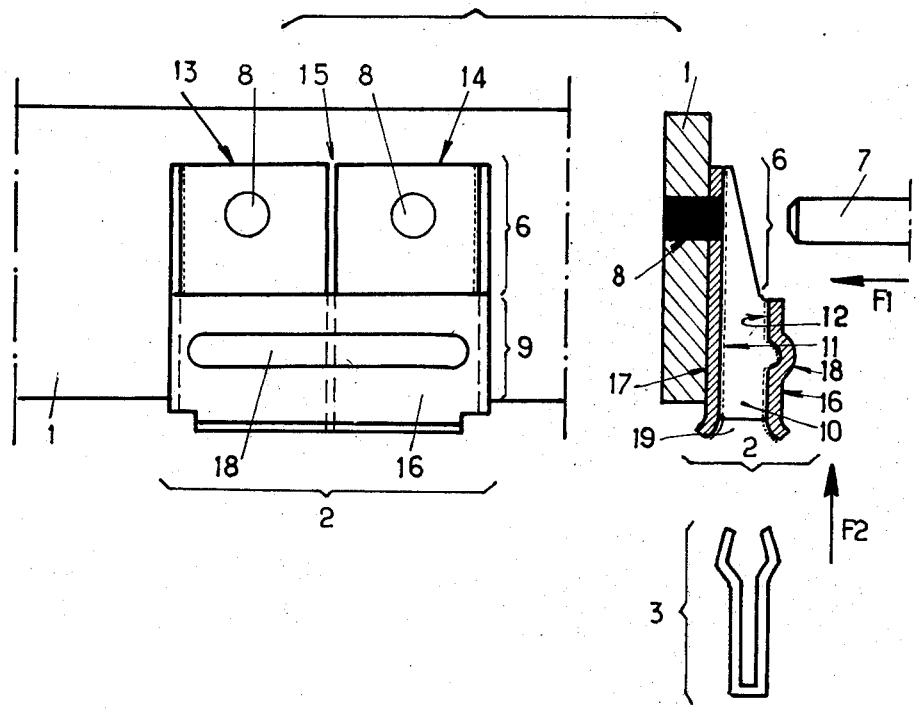
FIG. 1 shows in elevation and in cross-section a first embodiment of the socket according to the invention.

In FIG. 1, 1 is an aluminium busbar whilst 2 is the socket forming the power point for the connecting plug 3.

Figure 4:
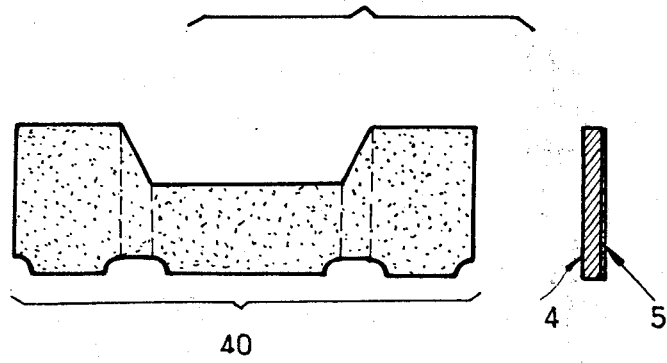
FIG. 4 shows the configuration of the sheet prior to folding the socket of FIG. 1.

The socket is obtained by folding along the edges shown by broken lines in FIG. 4 which shows in elevation and in cross-section the configuration and formation of a member cut from a strip comprising an aluminium support 4 and a copper layer 5.

After folding, during which the copper layer remains on the inside, the member assumes the form of a parallelepipedal body with first and second spaced major walls and transverse walls extending between them. A first area 6 forms a zone for access of a spot welding electrode such as 7 which when applied to the copper layer 5 in the direction of arrow F1, make a welding point 8 ensuring the fixing to busbar 1. The second area 9 forms a sheath 10 whose inner surface is also covered with copper with a view to receiving a connecting member such as plug 3 to be introduced in the direction of arrow F2.

It can be seen that the sheath 10 comprises two faces 11 and 12 located adjacent to the welding points 8 and that the latter are arranged in such a way that the connecting plug does not come into contact therewith.

As the folding of the strip has formed two flanges 13, 14 which are brought adjacent to one another to constitute the first major wall, a gap 15 is formed which at this level does not compromise the stability of the socket because the flanges receive the welding points 8.

The sheath 10 is bounded by the solid second wall 16 whose plane is substantially parallel to the opposite face 17 of the sheath.

The edges of the wall bounding the sheath 10, at the end of the entry of the plug 3 can have splayed edges in order to facilitate introduction.

As relatively high current intensities are to be transmitted by this socket, it is desirable that the pressure applied by the sheath shall be relatively high, for which purpose it is necessary to improve the rigidity of the solid portion 16, for example by providing ribs 18.

Figure 2:
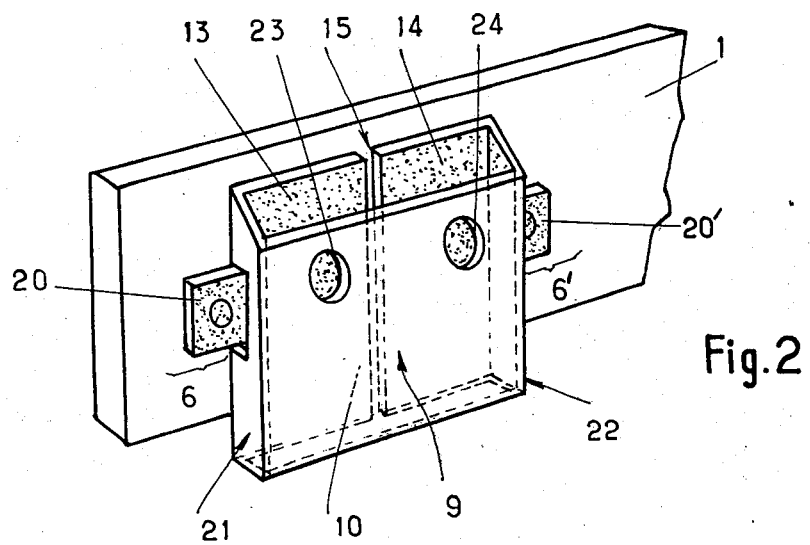
FIGS. 2 and 3 show variants represented in perspective view.
Figure 3:
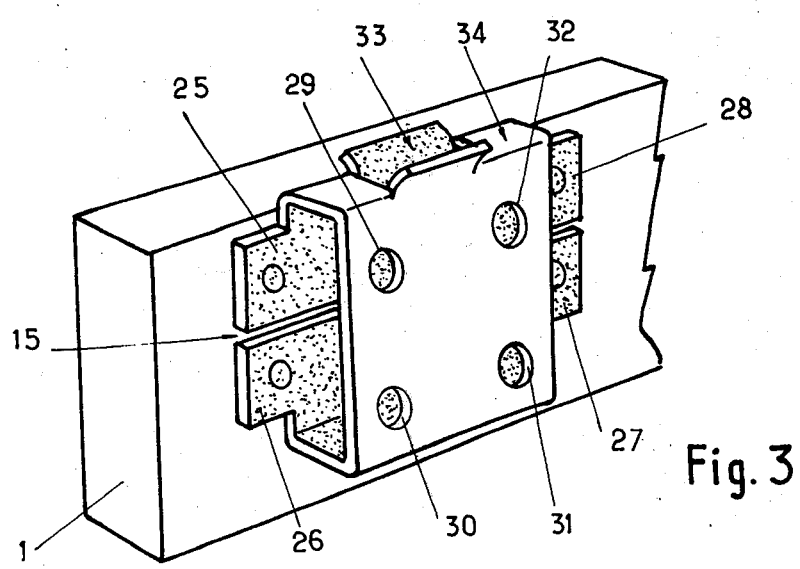

The variants shown in FIGS. 2 and 3 do not substantially differ from that described hereinbefore.

In the example of FIG. 2 the first major wall includes two areas 6, 6' reserved for welding and representing extensions 20, 20' of the portions 13, 14. Fixing by welding is obtained on the said extensions resulting from the bending over of a portion of the lateral faces 21, 22.

It is also possible to make two openings 23, 24 in the sheath in order to permit the passage of the welding electrodes. These openings are naturally arranged in such a way as to dispose the welding points 8 outside the contact area.

In the above examples, the sheath of the socket is formed by folding a strip along substantially parallel edges parallel to the direction of introduction of the plug as shown at F1.

If a sheath is formed by folding along edges perpendicular to the direction of introduction of the plug, the embodiment shown in FIG. 3 is obtained.

In this case, fixing by welding can be obtained by means of extensions 25, 26, 27, 28, or by means of openings 29, 30, 31, 32.

An opening 33 in wall 34 for the sheath has splayed edges.

I claim:

1. A socket, for securing in electrical connection on an aluminium busbar and adapted to receive in electrical connection a copper-faced plug, comprising a metal sheet constituted by a layer of aluminium bonded integrally with a layer of copper such that a first major face of the sheet is aluminium and a second major face of the sheet is copper, said sheet being bent along a number of fold lines so as to provide a first major wall, a second major wall opposite to and spaced transversely from the first major wall, and transverse walls extending between the first and second major walls, the respective surfaces of the first and second major walls which face each other being those of the copper layer and the respective surfaces which lie at the exterior of the socket being those of the aluminium layer, the opposed portions of the first and second major walls forming a copper-surfaced sheath defining a direction of entry and withdrawal for a copper-faced plug, and the first major wall having a zone accessible for application of a spot-welding electrode to weld said zone, in aluminium-to-aluminium contact, to a busbar.

2. A socket, as claimed in claim 1, wherein said zone of the first major wall is within the confines of that area of the first major wall which is opposed by the second major wall, and wherein the second major wall is apertured at a position corresponding to said zone.

3. A socket, as claimed in claim 1, wherein said zone of the first major wall is a portion of the first major wall extending beyond the second major wall in said direction of entry and withdrawal defined by the sheath.

4. A socket, as claimed in claim 1, wherein said zone of the first major wall is a portion of the first major wall extending beyond the second major wall in a direction transverse with respect to said direction of entry and withdrawal defined by the sheath.

5. A socket, as claimed in claim 1, wherein corresponding edge portions of the first major wall and of the second major wall defining an opening of the sheath are outwardly splayed to facilitate entry of a plug into the sheath.

6. A socket, as claimed in claim 1, wherein said second major wall is ribbed, transversely to said direction of entry and withdrawal defined by the sheath, to increase rigidity of said wall.

7. In combination, a socket as claimed in claim 1, and an aluminium busbar on which said socket is secured in aluminium-to-aluminium contact by spot welding.

8. A socket, as claimed in claim 1, wherein said first and second major walls and said transverse walls constitute a parallelepiped, and said first major wall is constituted by two portions of the sheet lying in a common plane and separated by a gap.

9. A socket, as claimed in claim 8, wherein said gap lies along said direction of entry and withdrawal defined by the sheath, and wherein said zone of the first major wall is provided by two lateral extensions of said first major wall.

10. A socket, as claimed in claim 8, wherein said gap lies at right angles to said direction of entry and withdrawal defined by the sheath, and wherein said zone of the first major wall is provided by lateral extensions of said first major wall.

* * * * *